| United States Patent [19]
Holmes et al.

[11] 3,857,891
[45] Dec. 31, 1974

[54] NEW AMINOALKANOL COMPOUNDS AND METHODS FOR THEIR PRODUCTION

[75] Inventors: Ann Holmes; Robert F. Meyer, both of Ann Arbor, Mich.

[73] Assignee: Parke, Davis & Company, Detroit, Mich.

[22] Filed: Dec. 14, 1971

[21] Appl. No.: 207,954

[52] U.S. Cl. ....... 260/570.7, 260/348 R, 260/465 E, 260/465 F, 260/501.18, 260/570.8 R, 260/592, 260/612 D, 424/304, 424/316, 424/330
[51] Int. Cl. ............................................ C07c 93/06
[58] Field of Search ..................... 260/570.7, 501.18

[56] References Cited
UNITED STATES PATENTS
| | | | |
|---|---|---|---|
| 3,337,628 | 8/1967 | Crowther et al. | 260/570.7 |
| 3,432,545 | 3/1969 | Howe | 260/501.17 |
| 3,501,769 | 3/1970 | Crowther et al. | 260/501.17 |

OTHER PUBLICATIONS
Crowther et al., "Journal Med. Chem.," Vol. 11, No. 5, pages 1009–1013 (1968).

Primary Examiner—Robert V. Hines

[57] ABSTRACT

1-(3,4-Dimethoxyphenethylamino)-3-(substituted phenoxy)-2-propanols; and acid-addition salts. The substituent in the 3-(substituted phenoxy) group can be lower alkoxy, chloro, cyano, hydroxymethyl, acetyl, m-lower alkyl, or o-allyl. The compounds are pharmacological agents, especially beta-adrenergic blocking agents with cardio-selective activity. They can be produced by reacting a 1-halo-3-(substituted phenoxy)-2-propanol with 3,4-dimethoxyphenethylamine; or by reacting a 1,2-epoxy-3-(substituted phenoxy)propane with 3,4-dimethoxyphenethylamine. Starting materials for use in those processes are obtained by reacting a phenol or a sodium phenolate with epichlorohydrin under varying conditions.

3 Claims, No Drawings

NEW AMINOALKANOL COMPOUNDS AND METHODS FOR THEIR PRODUCTION

SUMMARY AND DETAILED DESCRIPTION

The present invention relates to new aminoalkanol compounds. More particularly, the invention relates to new 1-(3,4-dimethoxyphenethylamino)-3-(substituted phenoxy)-2-propanols of the formula

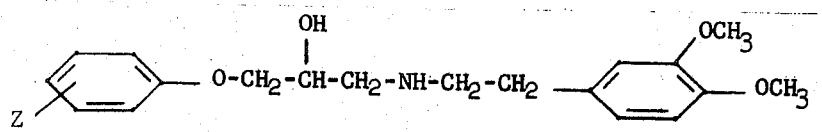

to salts thereof, and to methods for the production of the foregoing compounds; where Z represents lower alkoxy, chloro, cyano, hydroxymethyl, acetyl, m-lower alkyl, or o-allyl. The lower alkyl groups are preferably alkyl groups of not more than 4 carbon atoms. The lower alkoxy groups are preferably alkoxy groups of not more than four carbon atoms.

In accordance with the invention, the foregoing compounds can be produced by reacting a 1-halo-3-(substituted phenoxy)-2-propanol of the formula

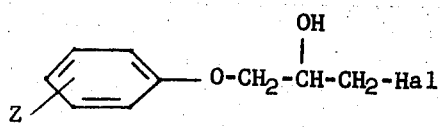

with 3,4-dimethoxyphenethylamine of the formula

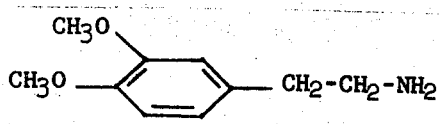

where Z is as defined before and Hal represents halogen, preferably chlorine. For the most efficient conversion of starting materials into final product, the reaction is preferably carried out in the presence of a base. Some examples of suitable bases are alkali metal hydroxides such as sodium hydroxide and potassium hydroxide; alkali metal alkoxides such as sodium methoxide and potassium methoxide; alkali metal carbonates such as sodium carbonate and potassium carbonate; and tertiary amines such as triethylamine and tributylamine. However, the preferred base is an excess of the 3,4-dimethoxyphenethylamine present as a reactant. It is customary to carry out the reaction without an added solvent, although a solvent can be used if desired. Some examples of suitable solvents are lower alkanols such as methanol and ethanol; ketones such as acetone and methyl ethyl ketone; ethers such as dioxane and tetrahydrofuran; hydrocarbons such as benzene and toluene; chlorinated hydrocarbons such as tetrachloroethane and ethylene dichloride; and tertiary amides such as N,N-dimethylformamide and N-methyl-2-pyrrolidinone. The 1-halo-3-(substituted phenoxy)-2-propanol and the 3,4-dimethoxyphenethylamine can be used in equimolar amounts along with at least an equivalent amount of added base which neutralizes the hydrogen halide formed during the reaction. When 3,4-dimethoxyphenethylamine is used as a base, it is preferred to use twice the equimolar amount of that substance. If desired a moderate excess of either reactant can be used in addition to the quantities indicated above. The time and temperature of the reaction are not particularly critical. In general, the reaction is carried out at a temperature from about 50° to 200° C. or the reflux temperature of the solvent, if one is used, for from 4 to 36 hours. The preferred conditions are 80° to 120° C. for 12 to 20 hours without an added solvent. The product is isolated directly as the free base or, following treatment with an acid, as an acid-addition salt. Typically, the product is first extracted from the reaction mixture with an organic solvent which leaves undissolved the salt also formed in the reaction.

The starting materials required in the foregoing process can be prepared by any of a variety of methods. For example, a phenol of the formula

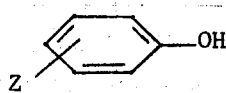

is reacted with epichlorohydrin in the presence of a catalytic amount of piperidine hydrochloride followed by treatment with hydrochloric acid to produce a 1-chloro-3-(substituted phenoxy)-2-propanol; where Z is as defined before.

Also in accordance with the invention, the compounds of the invention can be produced by reacting a 1,2-epoxy-3-(substituted phenoxy)propane of the formula

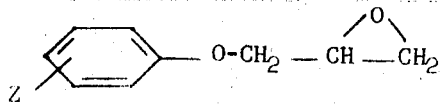

with 3,4-dimethoxyphenethylamine; where Z is as defined before. While it is customary to carry out the reaction without an added solvent, a solvent can be used if desired. Some examples of suitable solvents are lower alkanols such as methanol and ethanol; ketones such as acetone and methyl ethyl ketone; ethers such as dioxane and tetrahydrofuran; hydrocarbons such as benzene and toluene; chlorinated hydrocarbons such as tetrachloroethane and ethylene dichloride; and tertiary amides such as N,N-dimethylformamide and N-methyl-2-pyrrolidinone. The reactants are preferably used in approximately equimolar quantities, although a moderate excess of either can be used if desired. The time and temperature of the reaction are not particularly critical. In general, the reaction is carried out at a temperature from about 0° to 150° C. or the reflux temperature of the solvent, if one is used, for from 10 minutes to 24 hours, the longer times being used at lower reaction temperatures. The preferred conditions are to heat a mixture of the reactants without an added solvent for from 30 minutes to 3 hours at from 80° to 120° C. The product is isolated directly as the free base or, following treatment with an acid, as an acid-addition salt.

Starting materials required for use in the foregoing process can be prepared by any of a number of methods. According to one such method, a sodium phenolate of the formula

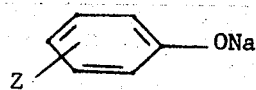

is reacted with epichlorohydrin to produce a 1,2-epoxy-3-(substituted phenoxy)propane; where Z is as defined before.

The free bases of the invention form acid-addition salts with any of a variety of inorganic and organic acids. Pharmaceutically acceptable acid-addition salts are formed with such acids as hydrochloric, hydrobromic, sulfuric, nitric, phosphoric, acetic, citric, tartaric, succinic, oxalic, benzoic, maleic, malic, lactic, gluconic, and pamoic acids. The free bases and their salt forms are interconvertible by adjustment of the pH. They differ in solubility properties but are otherwise equivalent for the purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention. In addition, they can exist in racemic form as well as in optically active d- and l- forms.

The compounds of the invention are new chemical compounds of value as pharmacological agents. They are beta-adrenergic blocking agents. A particular advantage of these compounds is that they are cardio-selective beta-adrenergic blocking agents, which means that they are more effective in blocking beta receptors in cardiac tissue than in other types of tissues. Their effects as beta-adrenergic blocking agents can be measured by their ability to block or antagonize the action of isoproterenol, an adrenergic agent, in various tissues. The procedures followed are those of Bristow et al., *Journal of Pharmacology and Experimental Therapeutics*, 171, 52–61 (1970), but using as test tissues albino guinea pig atrium and albino guinea pig trachea. In the case of 1-[(3,4-dimethoxyphenethyl)amino]-3-m-tolyloxy-2-propanol, a representative preferred compound of the invention, the values determined were $K_B$ (atrium) = 1.4 × $10^{-8}$; $K_B$ (trachea) = 3.6 × $10^{-7}$; $K_B$ (trachea)/$K_B$ (atrium) = 26. The ratio $K_B$ (trachea)/$K_B$ (atrium) is a measure of the degree to which the beta-adrenergic blocking activity is cardioselective. In the case of o-[3-[(3,4-dimethoxyphenethyl)-amino]-2-hydroxypropoxy]benzonitrile, another representative preferred compound of the invention, the values determined were $K_B$ (atrium) = 1.2 × $10^{-8}$; $K_B$ (trachea) = 4.2 × $10^{-7}$; $K_B$ (trachea)/$K_B$ (atrium) = 35. Cardio-selective beta-adrenergic blocking agents are of value in the treatment of angina pectoris and cardiac arrhythmias, such as tachycardia, without generalized beta blocking activity on other tissues. The compounds of the invention are active on oral or parenteral administration. Some of the preferred compounds are those wherein Z represents m-lower alkyl.

The invention is illustrated by the following examples.

EXAMPLE 1

A mixture of 40.1 g. of 1-chloro-3-m-tolyloxy-2-propanol and 72.4 g. of 3,4-dimethoxyphenethylamine is heated at 95–100° C. for 18 hours, cooled, and then stirred with ethyl acetate. Insoluble 3,4-dimethoxyphenethylamine hydrochloride is removed by filtration. The filtrate is washed with water, dried, and evaporated to give a residue of 1-[(3,4-dimethoxyphenethyl)amino]-3-m-tolyloxy-2-propanol.

The hydrochloride is obtained by dissolving this free base in isopropyl alcohol and adding a slight excess of hydrogen chloride in isopropyl alcohol. The insoluble hydrochloride salt is collected on a filter, washed with ether, and dried; m.p. 137°–138° C. following crystallization from acetonitrile.

By the foregoing general procedure, the following additional products are obtained.

From 10.72 g. of 1-chloro-3-(m-ethylphenoxy)-2-propanol and 18.1 g. of 3,4-dimethoxyphenethylamine, the product is 1-[(3,4-dimethoxyphenethyl)amino]-3-(m-ethylphenoxy)-2-propanol. The hydrochloride is obtained as described above; m.p. 129°–130° C. following crystallization from acetonitrile.

From 9.15 g. of 1-chloro-3-(m-isopropylphenoxy)-2-propanol and 14.5 g. of 3,4-dimethoxyphenethylamine, the product is 1-[(3,4-dimethoxyphenethyl)amino]-3-(m-isopropylphenoxy)-2-propanol; m.p. 68°–69° C. following crystallization from isopropyl ether.

From 12.12 g. of 1-(m-tert-butylphenoxy)-3-chloro-2-propanol and 18.1 g. of 3,4-dimethoxyphenethylamine, the product is 1-(m-tert-butylphenoxy)-3-[(3,4-dimethoxyphenethyl)amino]-2-propanol; m.p. 68°–70° C. following crystallization from isopropyl ether.

From 10.82 g. of 1-chloro-3-(m-methoxyphenoxy)-2-propanol and 18.1 g. of 3,4-dimethoxyphenethylamine, the product is 1-[(3,4-dimethoxyphenethyl)amino]-3-(m-methoxyphenoxy)-2-propanol. The monooxalate salt is obtained by mixing ethanol solutions of equimolar amounts of the free base and oxalic acid and collecting the insoluble product; m.p. 148°–150° C. following crystallization from ethanol.

From 8.84 g. of 1-chloro-3-(m-chlorophenoxy)-2-propanol and 14.5 g. of 3,4-dimethoxyphenethylamine, the product is 1-(m-chlorophenoxy)-3-[(3,4-dimethoxyphenethyl)-amino]-2-propanol; m.p. 82.5°–83.5° C. following crystallization from isopropyl ether.

From 8.84 g. of 1-chloro-3-(p-chlorophenoxy)-2-propanol and 14.5 g. of 3,4-dimethoxyphenethylamine, the product is 1-(p-chlorophenoxy)-3-[(3,4-dimethoxyphenethyl)-amino]-2-propanol; m.p. 100°–101° C. following crystallization from isopropyl ether.

From 10.82 g. of 1-chloro-3-(p-methoxyphenoxy)-2-propanol and 18.1 g. of 3,4-dimethoxyphenethylamine, the product is 1-[(3,4-dimethoxyphenethyl)amino]-3-(p-methoxyphenoxy)-2-propanol. The monooxalate salt is obtained as described above; m.p. 137°–138° C. following crystallization from ethanol.

From 8.84 g. of 1-chloro-3-(o-chlorophenoxy)-2-propanol and 14.5 g. of 3,4-dimethoxyphenethylamine, the product is 1-(o-chlorophenoxy)-3-[(3,4-dimethoxyphenethyl)-amino]-2-propanol; m.p. 80.5°–81.5° C. following crystallization from isopropyl ether.

From 10.82 g. of 1-chloro-3-(o-methoxyphenoxy)-2-propanol and 18.1 g. of 3,4-dimethoxyphenethylamine, the product is 1-[(3,4-dimethoxyphenethyl)amino]-3-(o-methoxyphenoxy)-2-propanol. The monooxalate salt is obtained as described above; m.p. 149°–151° C. following crystallization from ethanol.

From 11.52 g. of 1-chloro-3-(o-ethoxyphenoxy)-2-propanol and 18.1 g. of 3,4-dimethoxyphenethylamine, the product is 1-[(3,4-dimethoxyphenethyl)amino]-3-(o-ethoxyphenoxy)-2-propanol. The hydrochloride salt is obtained as described above; m.p. 113°–114° C. following crystallization from acetonitrile.

From 9.07 g. of 1-(o-allylphenoxy)-3-chloro-2-propanol and 14.5 g. of 3,4-dimethoxyphenethylamine, the product is 1-(o-allylphenoxy)-3-[(3,4-dimethoxyphenethyl)-amino]-2-propanol; m.p. 66°–67.5° C. following crystallization from isopropyl ether.

From 42.2 g. of 1-chloro-3-(o-cyanophenoxy)-2-propanol and 72.4 g. of 3,4-dimethoxyphenethylamine, the product is o-[3-[(3,4-dimethoxyphenethyl)amino]-2-hydroxypropoxy]benzonitrile. The monooxalate salt is obtained as described above; m.p. 125°–127° C. following crystallization from ethanol.

From 42.2 g. of 1-chloro-3-(p-cyanophenoxy)-2-propanol and 72.4 g. of 3,4-dimethoxyphenethylamine, the product is p-[3-[(3,4-dimethoxyphenethyl)amino]-2-hydroxy-propoxy]benzonitrile; m.p. 125°–126° C. following crystallization from isopropyl ether.

From 26.4 g. of 1-chloro-3-(o-hydroxymethylphenoxy)-2-propanol and 44.3 g. of 3,4-dimethoxyphenethylamine, the product is o-[3-[(3,4-dimethoxyphenethyl)amino]-2-hydroxypropoxy]benzyl alcohol. The monooxalate salt is obtained as described above; m.p. 125°–127° C. following crystallization from ethanol.

From 22.8 g. of 1-(o-acetylphenoxy)-3-chloro-2-propanol and 36.2 g. of 3,4-dimethoxyphenethylamine, the product is 2′-[3-[(3,4-dimethoxyphenethyl)amino]-2-hydroxypropoxy]acetophenone. The monooxalate salt is obtained as described above; m.p. 145°–150° C. following crystallization from ethanol.

EXAMPLE 2

A mixture of 8.2 g. of 1,2-epoxy-3-m-tolyloxypropane and 9.05 g. of 3,4-dimethoxyphenethylamine is heated at 95°–100° C. for 1 hour, cooled, and then stirred with ether. The insoluble product is collected on a filter. It is 1-[(3,4-dimethoxyphenethyl)amino]-3-m-tolyloxy-2-propanol. The hydrochloride is obtained by dissolving this free base in isopropyl alcohol and adding a slight excess of hydrogen chloride in isopropyl alcohol. The insoluble hydrochloride salt is collected on a filter, washed with ether, and dried; m.p. 137°–138° C. following crystallization from acetonitrile. A salt with tartaric acid is obtained by mixing ethanol solutions of equimolar amounts of the free base and tartaric acid and evaporating the mixture to dryness.

By the foregoing general procedure, the following additional products are obtained.

From 9.6 g. of 1,2-epoxy-3-(p-acetylphenoxy)propane and 9.05 g. of 3,4-dimethoxyphenethylamine the product is 4′-[3-[(3,4-dimethoxyphenethyl)amino]-2-hydroxypropoxy]acetophenone. The monooxalate salt is obtained by mixing ethanol solutions of equimolar amounts of the free base and oxalic acid; m.p. 175°–176° C. following crystallization from ethanol.

From 9.6 g. of 1,2-epoxy-3-(m-acetylphenoxy)propane and 9.05 g. of 3,4-dimethoxyphenethylamine, the product is 3′-[3-[(3,4-dimethoxyphenethyl)amino]-2-hydroxypropoxy]acetophenone. The monooxalate salt is obtained as described above; m.p. 136°–138° C. following crystallization from ethanol.

Starting Materials

1-Chloro-3-(substituted phenoxy)-2-propanols (can also be designated as 1-aryloxy-3-chloropropan-2-ols) are prepared from the correspondingly substituted phenol, excess epichlorohydrin, and a catalytic amount of piperidine or piperidine hydrochloride according to the procedure of Stephenson, *Journal of the Chemical Society*, 1571–1577 (1954), at page 1573. Some of the compounds prepared by this procedure are the following.

1-Chloro-3-(m-ethylphenoxy)-2-propanol; b.p. 121°–124° C. at 0.5 mm.

1-Chloro-3-(m-isopropylphenoxy)-2-propanol; b.p. 135°–136° C. at 1.2 mm.

1-(m-tert-Butylphenoxy)-3-chloro-2-propanol; b.p. 125°–127° C. at 0.15 mm.

1-Chloro-3-(o-cyanophenoxy)-2-propanol; b.p. 153°–155° C. at 0.15 mm.

1-Chloro-3-(o-hydroxymethylphenoxy)-2-propanol; b.p. 135°–140° C. at 0.15 mm.

1-(o-Acetylphenoxy)-3-chloro-2-propanol; m.p. 47°–48° C. following crystallization from isopropyl ether.

1,2-Epoxy-3-(substituted phenoxy)propanes are prepared from the correspondingly substituted phenol, epichlorohydrin, and excess sodium hydroxide according to the procedure described for 4-(2,3-epoxypropoxy)acetanilide by Crowther et al., *Journal of Medicinal Chemistry*, 14, 511–513 (1971), at page 512. Some of the compounds prepared by this procedure are the following.

1,2-Epoxy-3-m-tolyloxypropane 1,2-Epoxy-3-(p-acetylphenoxy)propane; b.p. 120°–122° C. at 0.15 mm.

1,2-Epoxy-3-(m-acetylphenoxy)propane; b.p. 112°–114° C. at 0.15 mm.

We claim:

1. A member of the class consisting of compounds of the formula

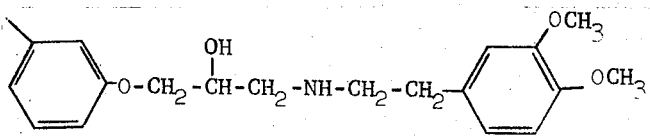

and acid-addition salts thereof.

2. A compound according to claim 1 which is 1-[(3,4-dimethoxyphenethyl)amino]-3-m-tolyloxy-2-propanol.

3. A compound according to claim 1 which is 1-[(3,4-dimethoxyphenethyl)amino]-3-m-tolyloxy-2-propanol hydrochloride.

* * * * *